United States Patent [19]

Andreassen

[11] Patent Number: 5,487,349
[45] Date of Patent: Jan. 30, 1996

[54] DEVICE FOR COMBINED USE AS A LADDER, FENDER AND LIFE-BUOY FOR BOATS

[76] Inventor: Leif Andreassen, Fagerliveien 3, N-9007 Tromsø

[52] U.S. Cl. .......................................... 114/219; 114/362
[58] Field of Search .................................. 114/343, 362, 114/363, 364, 219; 441/80; 182/194, 129, 20, 21

[56] References Cited

U.S. PATENT DOCUMENTS

| | | | |
|---|---|---|---|
| 3,540,403 | 11/1970 | Russell | 114/219 |
| 4,014,057 | 3/1977 | Kuojarvi | 114/362 |
| 4,376,419 | 3/1983 | Heilskov | 114/219 |
| 4,546,856 | 10/1985 | Nagao | 114/219 |
| 4,788,926 | 12/1988 | Ullman et al. | 114/362 |
| 5,152,245 | 10/1992 | Olsen | 114/362 |

*Primary Examiner*—Stephen Avila
*Attorney, Agent, or Firm*—Locke Reynolds

[57] ABSTRACT

A device for use as a combined ladder and fender for boats involves components of a first type and components of a second type, each component including two parallel side members of fixed length having inner and outer surfaces. At least two rigid steps are fixed between the inner surfaces of the side members of both types of components in spaced parallel relation to each other in ladder form. The first component also includes fender elements preferably having a soft surface and a compressible consistency fixed to the outer surface of each side member. Each fender element has a lateral cross-section which is generally rounded and bigger in dimension than the side members. Each side member also includes an upper extremity and a lower extremity including a laterally directed hole. The components can be used independently or can be coupled together with pins through the laterally directed holes to pivotally connect the components together lengthwise. The fender elements are preferably sufficiently buoyant to permit the first components to perform the function of a life-buoy.

18 Claims, 6 Drawing Sheets

DEVICE FOR COMBINED USE AS A LADDER, FENDER AND LIFE-BUOY FOR BOATS

The present invention is a combined ladder, fender and life-buoy for boats and marine purposes. It is designed to serve equally well in any of these functions. The device can also be used as a safety ladder, boarding ladder, bathing ladder and life-buoy.

In later years there has been a strongly developing trend in purchasing and enjoying the use of yachts and pleasure craft of various types. A pleasure boat represents a sizeable investment and it is desirable to keep it in best shape as long as possible. One wishes therefore to avoid the danger of damage to boats when they dock alongside quay, alongside another craft or in marinas with floating stages and piers, especially in wind and rough seas.

Figure 6:
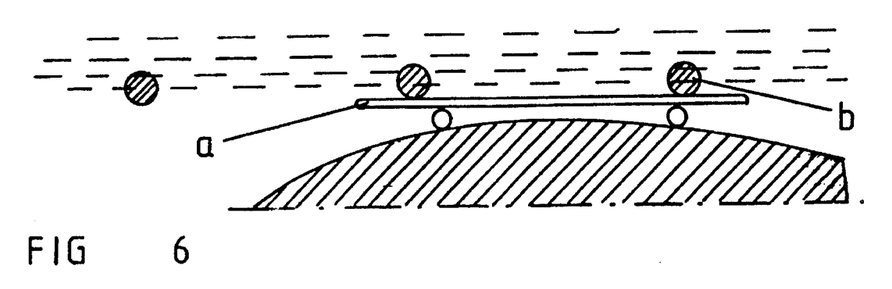
FIG. 6: Illustration of the use of a fender board.
Figure 7:
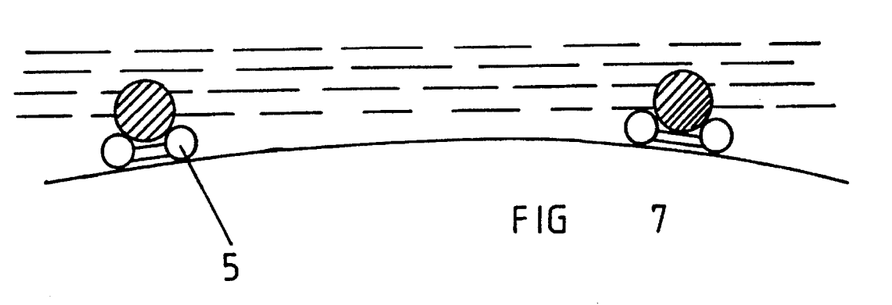
FIG. 7: The device used as a fender against a quay supported on vertical posts.

Fenders have traditionally been used to prevent such damage. With a soft surface and a somewhat compressible consistency, their purpose is to protect hull and freeboard. Fenders vary greatly in shape, from the spherical balls of rope to cork and plastic fenders. The function and suitability of a fender depend largely on its design. A spherical fender provides a safe distance from boat to quay but a minimal contact face and an unstable contact point against irregular surfaces. A cylindrical fender provides a larger contact face. However, this is not always sufficient in certain cases as it slips easily. The most practical fenders are designed with a large contact face. The use of fenders of traditional design is particularly problematic as a protection against quays using car tires as fenders. The boat's own fenders slide inside and between the tires and are of little use for preventing discoloration of the boat by the tires. In addition, quays which are supported by straight vertical posts only have always been a problem for small craft. The traditional shapes given to fenders prevent the fenders from resting against the posts in a stable position, and it is necessary to resort to the well-known trick of using a so-called fender board a between the quay posts b and the boat's fenders. See FIG. 6.

For reasons of convenience and safety, various devices have traditionally been used for embarking and disembarking. When the deck of the craft and the quay, or floating stage or other craft, are at different heights, it has been necessary to use ladders or gangways made of rope, wood or metal.

The trend in development has also resulted in combined ladders and fenders. GB patent no. 921,383 presents a ladder equipped with an anti-slide and somewhat elastic material on the side of the ladder which is in contact with the hull. This solution has very little to do with a fender, and its purpose is more to prevent the metal ladder from damaging the hull. U.S. Pat. No. 4,546,856 shows a further step in the development of a combined ladder and fender in the form of a fixed quay ladder equipped with side members acting as fenders. This invention is quite suitable for quays, but is of no help on board a craft.

Norwegian patent no. 165,063 shows a fender provided with a pullout rope ladder. The result is a rescue ladder intended as an emergency device should someone fall overboard, but it is hardly suitable as a boarding ladder under normal circumstances. The fender function has a certain stabilizing function between two hulls with straight freeboard, but is not satisfactory when used against slanting freeboards or as a fender against quay posts.

U.S. Pat. No. 3,411,166 presents a combined ladder and raft equipped with float elements along the outer edge, ribs between the edges, and a bow-like part to which a paddle is attached. A person can He on the ribs and operate the paddle which can rotate in relation to the bow. This will propel the craft forward. The raft can function as a floating device for rescue purposes, but cannot be slipped over the person's head as a life-buoy can, and provide the necessary stability and safety to reserve a person in danger.

The rapidly increasing number of yachts and pleasure boats has accelerated the development of marinas equipped with floating stages and piers where boats can dock and moor. Such piers and floating gangways are often low, and this factor has created the need for a ladder which can hang overboard and facilitate embarkment from a floating gangway. An ordinary ladder made of wood or any other hard material cannot be left to hang overboard. It must be let down before embarkment and must be taken up again after disembarkation because of the risk of damage to the hull in rough sea. The same problem arises when embarking or disembarking between craft of different freeboard height, or between craft swinging at anchor and light craft.

The object of the present invention is to provide an optimal device which can satisfactorily function both as a ladder, as a life-buoy and as a fender in all situations. The device of the invention is meant to function as a ladder and at the same time as a fender between the craft and the floating gangways in marinas. This function is also extended to the use of the device as a combined ladder and fender for embarkment.

The shape of the device, its size and the material selected provide a device perfectly suited to its use as a fender against tire-protected quays, irregular quays and quays supported on vertical posts. In the last instance, the step provided on the device will act as a fender board.

In addition to its function as fender, the device can also be used as a safety ladder, an embarkation ladder, a bathing ladder and a life-buoy.

The device is designed to accommodate straight vertical freeboards, freeboards slanting inward or outward and freeboards with a built-in fender strip.

The object of the invention is achieved by positioning the side members on the main part of the device at a distance approximately equal to the greater dimension of each fender and float element, in a direction parallel to the steps of the ladder. Furthermore, the fender and float elements are given a conventional rounded cross-section, more precisely of a circular or elliptical shape.

Further details of the present invention will appear from the description of a preferred embodiment below, and from the figures and claims.

Figure 1:
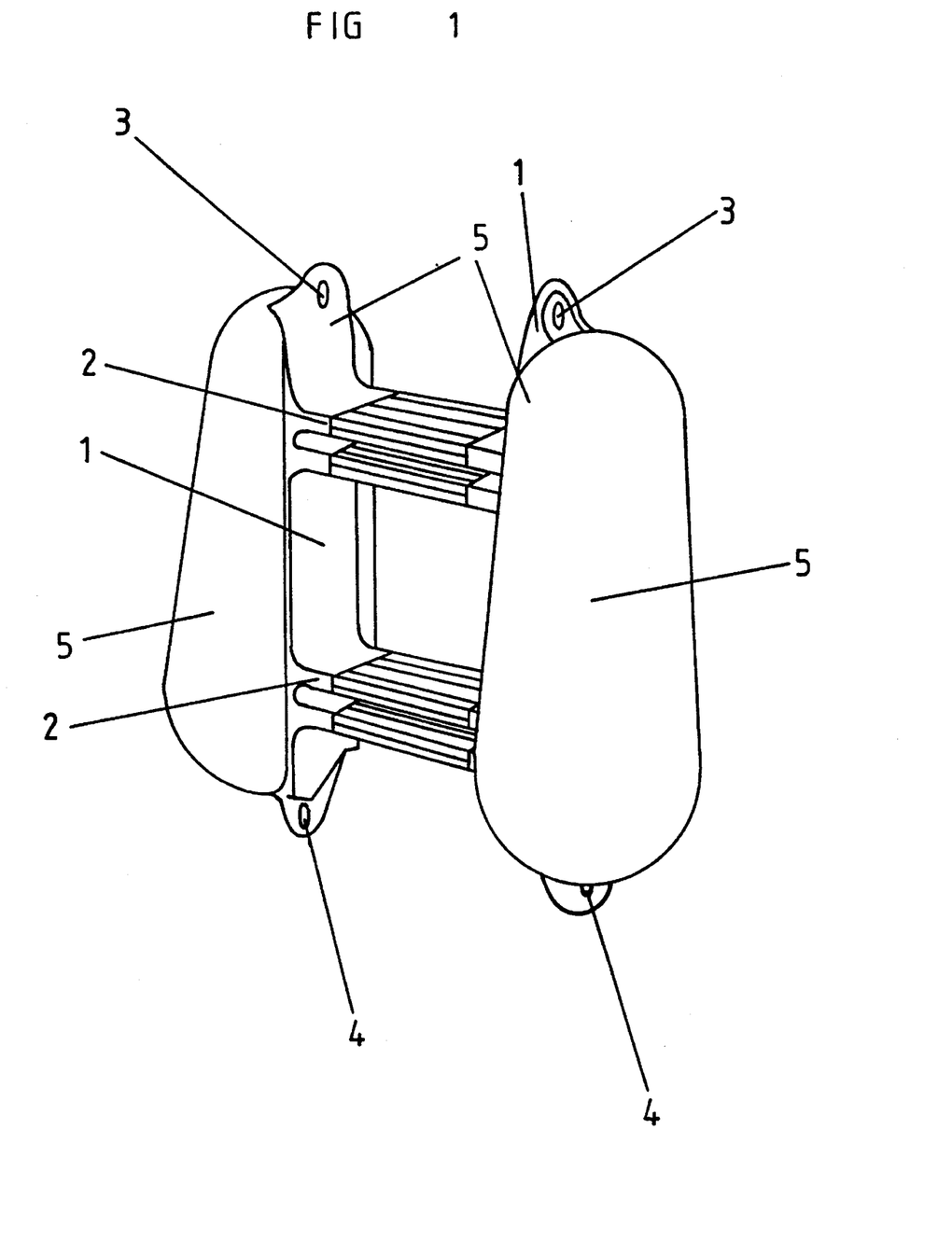
FIG. 1.: A perspective view of the device.

The device is designed on the basis of two vertical side members 1 in between which horizontal steps 2 are provided. At the upper vertical extremity of each side member 1, a horizontal suspension hole 3 is provided. At the opposite vertical extremity of the side members 1, one extension hole 4 is provided in each side member 1.

Figure 3:
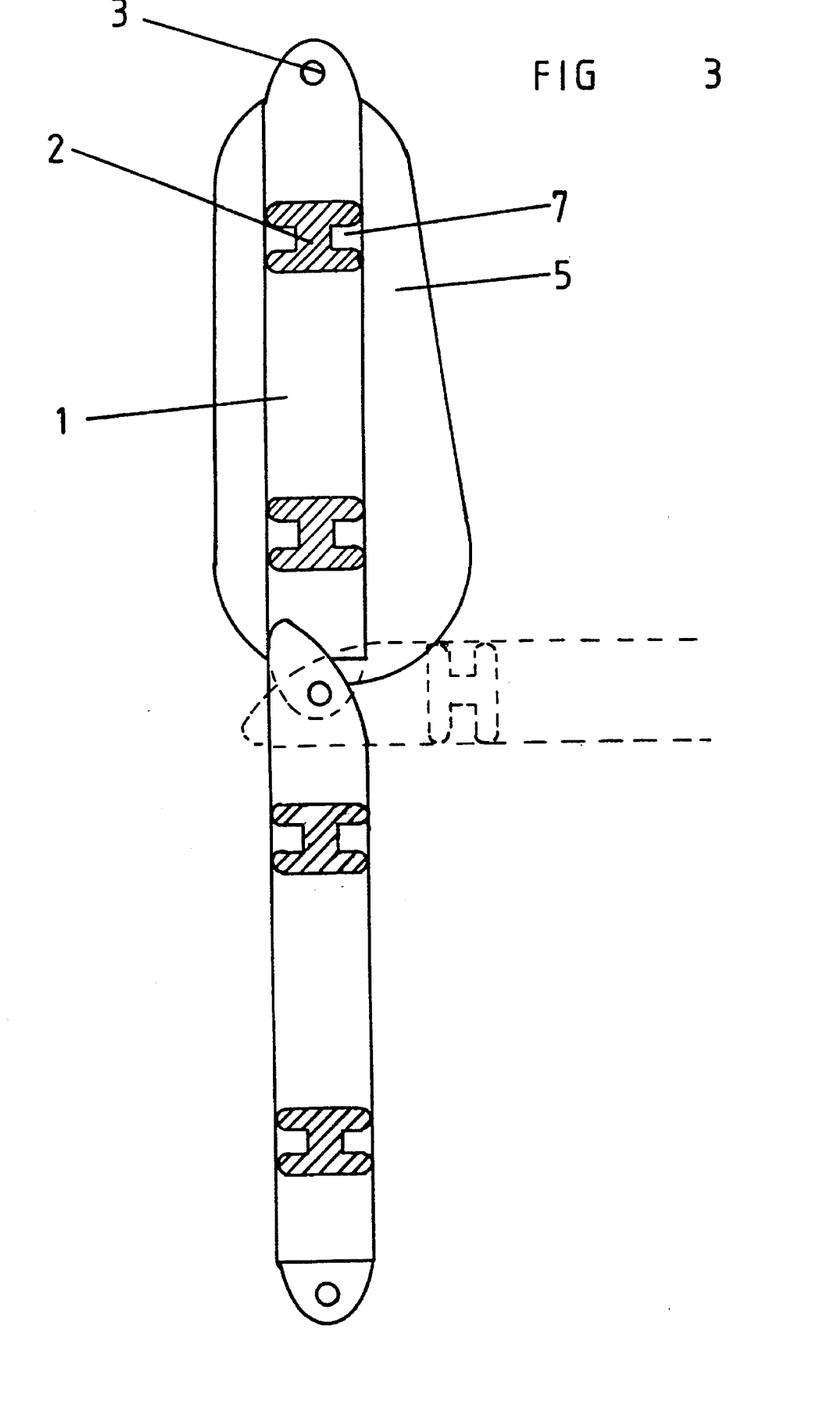
FIG. 3: A vertical lateral view of the device.

On the face of each side member 1 facing away from the steps 2, a fender element is attached. The fender elements have rounded shapes, but their vertical cross section in a plane parallel to the hull of the boat approximates the shape of an irregular quadrilateral. This quadrilateral would be obtained starting from a right-angled triangle, the most acute angle of which would be removed when the figure is bisected by a straight line parallel to the shortest side of the triangle. The resulting figure is then a quadrilateral with two parallel sides and a third side which is perpendicular to the parallel sides. The fourth side slants in relation to the opposite side. The fender element 5 is fixed to the side member 1 on the side which is perpendicular to the two parallel sides.

A cross section through the fender element 5, perpendicular to the hull, results in a similar shape to that described above. In this cross section, however, the side which is perpendicular to the two parallel sides of the quadrilateral faces a vertical plane which is parallel to the main plane through the side member 1 and the steps 2.

The resulting shape of the fender elements 5 enables the device to hang in a stable position down the side of the hull, and provides a device which may equally successfully be used with hulls of various freeboard types.

Figure 2A:
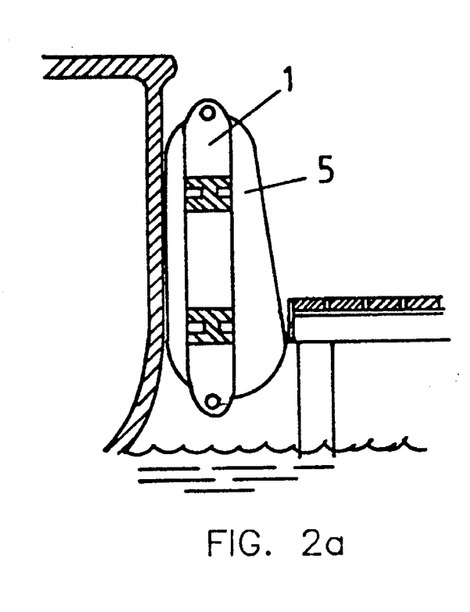
FIG. 2a: The device used as a ladder and fender between a boat with vertical freeboard and a floating gangway.
Figure 2B:
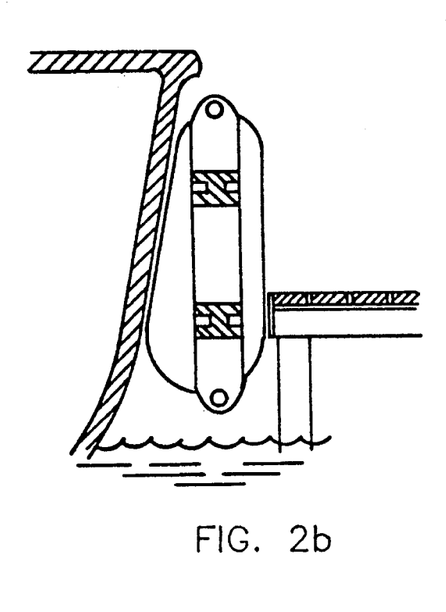
FIG. 2b: The device of the previous figure used on a boat with freeboard slanting inward.
Figure 2C:
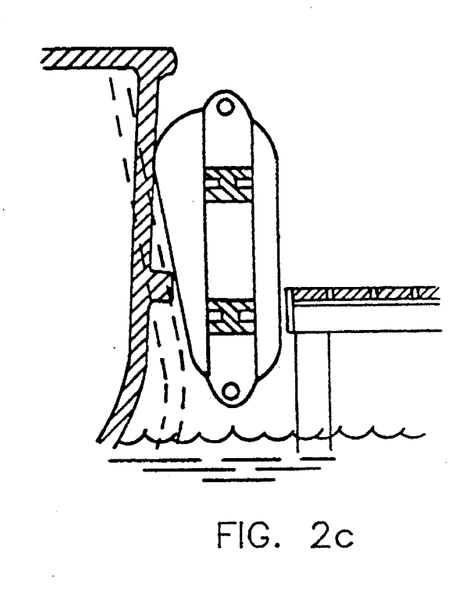
FIG. 2c: The device of FIG. 2a, used on a boat with freeboard slanting outward.

FIGS. 2a, b and c show the device used as ladder and fender with hulls with various freeboard design. To obtain a constantly horizontal direction for the steps, independently of the slope of the freeboard, it is sufficient to displace the device forward or backward from the centre of the hull.

Figure 4:
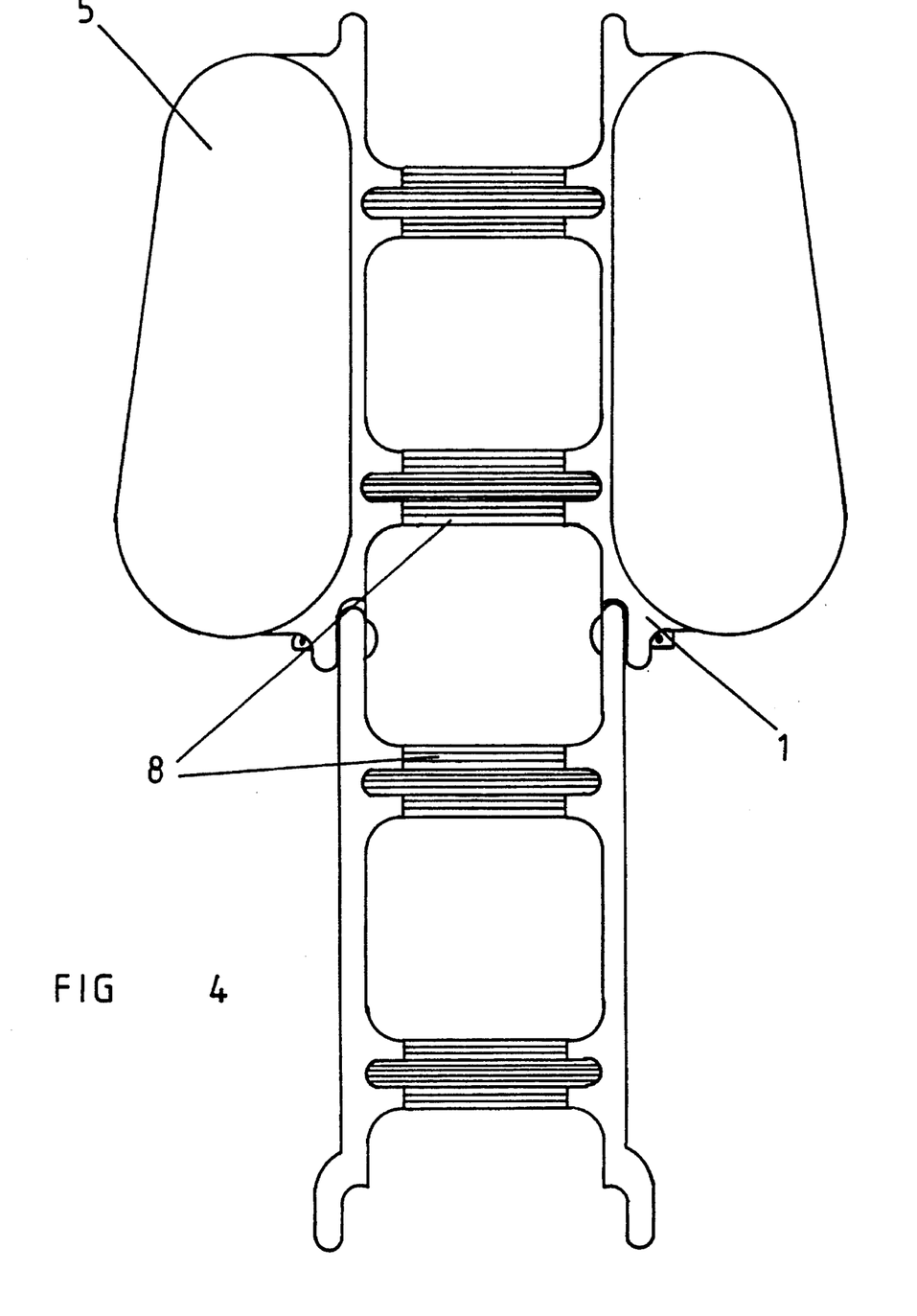
FIG. 4: The device shown with a ladder without fenders, with a bathing ladder.

FIG. 4 illustrates how a device can be extended with a ladder identical to the ladder element of the device, and thus combines into a safety ladder or bathing ladder. Connecting several elements together as shown on the figure, results in an embarkation ladder for large boats. Every other element of the embarkation ladder is a device of the present invention functioning as a spacer between the ladder and the hull of the boat, thus ensuring an adequate depth of step for the safety of the users.

Figure 5A:
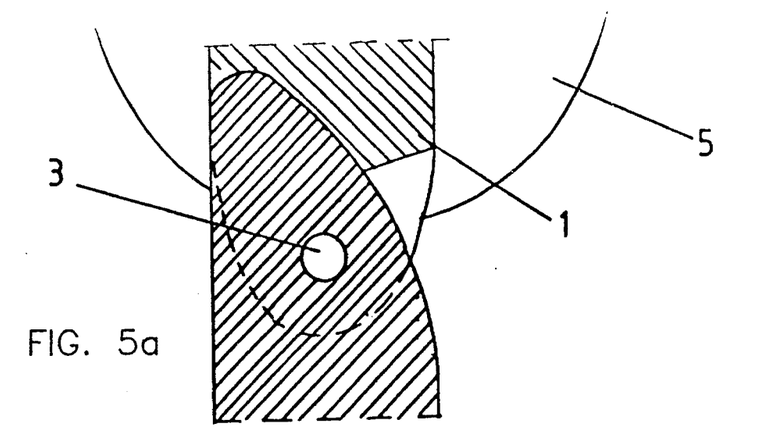
FIGS. 5a, 5b, 5c: Device shown with slots in the steps.
Figure 5B:
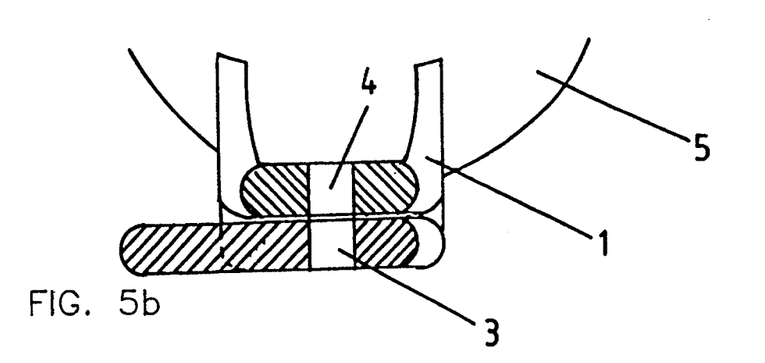
Figure 5C:
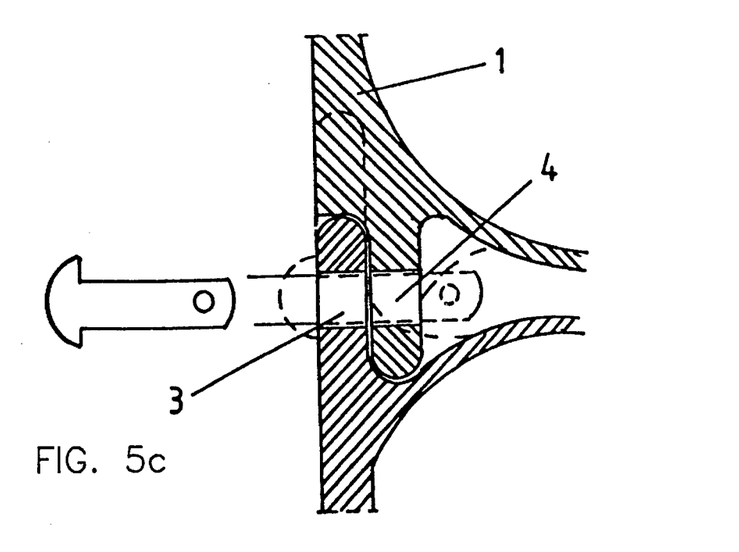

Several figures illustrate that the steps 2 of the device are provided with one or more through slots 7. The slot 7 provides increased safety with an improved handgrip. This is of particular importance when the ladder is used as a safety ladder, an embarkation ladder, a bathing ladder and as a life-buoy.

In addition, the steps 2 are provided with grooves 8 to further improve handgrip and foothold.

The fender elements 5 have sufficient buoyancy in water to enable the device to serve as a life-buoy.

I claim:

1. A device for use as a combined ladder and fender for boats comprising: two parallel side members, each side member including an inner surface and an outer surface, each side member also including an upper extremity and a lower extremity separated from each other by a fixed length, at least two rigid steps fixed between the inner surfaces of the side members in spaced parallel relation to each other, and fender elements fixed to the outer surface of each side member, each fender element having a cross-section which is generally rounded and bigger in dimension than the side members extending continuously from adjacent the upper extremity to adjacent the lower extremity.

2. The device of claim 1 wherein the upper extremity and lower extremity of each side member includes a laterally directed hole, each of the fender elements being confined vertically between the holes.

3. The device of claim 1 wherein each of the steps includes an upper surface and a lower surface, and further includes a recess in at least one side of the steps parallel to the step surfaces providing a handgrip.

4. The device of claim 1 wherein the cross-sectional area of each fender measured at a selected distance from one extremity is greater than the cross-sectional area of each fender measured at the same selected distance from the other extremity.

5. The device of claim 1 wherein the fender elements include a foremost edge and a rearmost edge, one of the foremost and rearmost edges being arranged parallel to the side members, the other of the foremost and rearmost edges being inclined with respect to the side members.

6. The device of claim 1 further comprising a ladder element rotationally coupled to one of the extremities of both side members.

7. The device of claim 1 wherein the lower extremities of the two side members are separated from each other by a distance greater than the upper extremities to permit coupling of the lower extremities of one such device to the upper extremities of another such device.

8. A device for use as a combined ladder and fender for boats comprising: two parallel side members, each side member including an inner surface and an outer surface, each side member also including an upper extremity and a lower extremity separated from each other by a fixed length, at least two rigid steps fixed between the inner surfaces of the side members in spaced parallel relation to each other, and fender elements having a compressible consistency fixed to the outer surface of each side member, each fender element having a cross-section which is generally rounded and bigger in dimension than the side members.

9. The device of claim 8 wherein the inner surface of the lower extremities of the two side members are separated from each other by a distance greater than the outer surface of the upper extremities to permit coupling of the lower extremities of one such device to the upper extremities of another such device.

10. The device of claim 9 wherein the upper extremity and lower extremity of each side member includes a laterally directed hole, each of the fender elements being confined vertically between the holes, and further comprising at least one ladder element having one end positioned contiguous to one of the upper and lower extremities, and pivot pins rotationally coupling the at least one ladder element to one of the extremities of both side members.

11. The device of claim 10 wherein each ladder element includes at least two steps, each of the steps of the ladder element and said rigid steps including an upper surface and a lower surface, and further including a recess in at least one side of the steps parallel to the step surfaces providing a handgrip, the steps of the ladder element and said rigid steps being spaced from each other by a uniform distance.

12. The device of claim 8 wherein each of said fender elements is unitary with the side member to which the fender element is fixed, the fender element having a soft surface and including a hollow interior to provide buoyancy in water.

13. A device for use as a combined ladder and fender for boats comprising: a first component and a second component, each component including two parallel side members, each side member including an inner surface and an outer surface, each side member also including an upper extremity and a lower extremity separated from each other by a fixed length, the upper and lower extremities including a laterally directed hole, each component also including at least two rigid steps fixed between the inner surfaces of the side members in spaced parallel relation to each other, the first component also including fender elements having a soft surface and a compressible consistency fixed to the outer surface of each side member, each fender element having a lateral cross-section which is generally rounded and bigger in dimension than the side members, the fender elements being confined longitudinally to a region located between the holes in the upper and lower extremities, and pivot/pins received in the laterally directed holes rotationally coupling the upper extremities of the second component to the lower extremities of the first component.

14. The device of claim 13 wherein each of the steps of the components includes an upper surface and a lower surface, and further includes recesses in the sides of the steps parallel to the step surfaces for providing a handgrip, the steps having a generally H-shaped cross-section and including grooves for enhancing handgrip and foothold, the steps of the components being serially spaced from each other by a uniform distance.

15. The device of claim 13 wherein the inner surface of the lower extremities of the side members are separated from each other by a distance greater than the outer surface of the upper extremities to permit coupling of the lower extremities of one such device to the upper extremities of another such device.

16. The device of claim 13 wherein the fender elements include a foremost edge and a rearmost edge, one of the foremost and rearmost edges being arranged parallel to the side member to which each fender element is fixed, the other of the foremost and rearmost edges being inclined with respect to the side member, the fender elements being unitary with the side member to which the fender element is fixed, each fender element including a hollow interior to provide buoyancy to the device in water.

17. The device of claim 13 wherein the fender elements comprise in vertical outline a shape approximating an irregular quadrilateral with rounded corners, the quadrilateral consisting of two parallel sides of differing length, a third side perpendicular to each of the parallel sides, and a fourth side slanting in relation to the third side.

18. The device of claim 17 wherein the third side of the quadrilateral is situated parallel to the side member to which the fender element is fixed.

* * * * *

UNITED STATES PATENT AND TRADEMARK OFFICE
CERTIFICATE OF CORRECTION

PATENT NO. : 5,487,349
DATED : January 30, 1996
INVENTOR(S) : Leif Andreassen It is certified that error appears in the above-identified patent and that said Letters Patent is hereby corrected as shown below:

On the title page, between items [76] and [52], insert the following items:

```
--[21]  Appl. No.:        211,467
  [22]  PCT Filed:        Sept. 24, 1992
  [86]  PCT No.:          PCT/NO92/00160
        § 371 Date:       Mar. 30, 1994
        § 102(e) Date:    Mar. 30, 1994
  [87]  PCT Pub. No.:     WO93/07050
        PCT Pub. Date:    Apr. 15, 1993
  [30]            Foreign Application Priority Data
    Oct. 2, 1991  [NO]    Norway...................913879--
```

At column 5, line 9, delete "pivot/pins" and insert therefor --pivot pins--.

Signed and Sealed this

Thirteenth Day of August, 1996

Attest:

BRUCE LEHMAN

*Attesting Officer*              *Commissioner of Patents and Trademarks*